United States Patent

Sundberg et al.

[11] Patent Number: 5,510,211
[45] Date of Patent: Apr. 23, 1996

[54] BIPOLAR BATTERY AND METHOD OF MAKING A PARTITION WALL FOR SUCH A BATTERY

[76] Inventors: Erik Sundberg, Nicandersgstan 5, Helsingborg; Ove Nilsson, Utterstigen 2, Nol, both of Sweden

[21] Appl. No.: 167,824
[22] PCT Filed: Jul. 1, 1992
[86] PCT No.: PCT/SE92/00493
§ 371 Date: Jul. 21, 1994
§ 102(e) Date: Jul. 21, 1994
[87] PCT Pub. No.: WO93/01624
PCT Pub. Date: Jan. 21, 1993

[30] Foreign Application Priority Data

Jul. 1, 1991 [SE] Sweden .................................. 9102039

[51] Int. Cl.6 ...................................... H01M 6/48
[52] U.S. Cl. ............................ 429/210; 429/120
[58] Field of Search ....................... 429/210, 225, 429/252, 129, 234, 245, 185; 29/623.5

[56] References Cited

U.S. PATENT DOCUMENTS

| | | |
|---|---|---|
| 3,817,788 | 6/1974 | Eckerbom . |
| 3,819,412 | 6/1974 | Taylor . |
| 4,124,746 | 11/1978 | Nordblom et al. .................... 429/210 |
| 4,275,130 | 6/1981 | Rippel et al. ........................... 429/144 |
| 4,297,421 | 10/1981 | Turillon . |
| 4,542,082 | 9/1985 | Rowlette . |
| 4,731,305 | 3/1988 | Goebel et al. ....................... 429/210 X |
| 5,141,828 | 8/1992 | Bennion et al. .................... 429/210 X |
| 5,234,779 | 8/1993 | Mix et al. ........................... 429/210 X |

FOREIGN PATENT DOCUMENTS

| | | |
|---|---|---|
| 116554 | 6/1946 | Sweden . |
| WO89/10011 | 10/1989 | WIPO . |

*Primary Examiner*—Anthony Skapars
*Attorney, Agent, or Firm*—Townsend and Townsend and Crew

[57] ABSTRACT

In a bipolar acid containing battery comprising at least two cell units being divided by a dimensional stable electroconductive wall (5) which constitutes or supports the positive (6) and the negative (7) electrodes in two adjacent cells, said wall is comprised of non-electroconductive dimensional stable porous material (10) having pores (8) passing from its positive to its negative side and having said pores (8) filled with electroconductive lead, a lead alloy or a similar metal or alloy, making the electrical contact between two adjacent cell units. By the porous material (10) being non-electroconductive and dimensional stable the transformation of the metal and thus the volume increase of the metal or the alloy during working conditions are restricted, whereby the wall (5) is protected from through corrosion. The invention also concerns a method of producing an electroconductive dimensional stable partition wall (5) for a bipolar battery.

7 Claims, 4 Drawing Sheets

BIPOLAR BATTERY AND METHOD OF MAKING A PARTITION WALL FOR SUCH A BATTERY

BACKGROUND OF THE INVENTION

The invention concerns a bipolar battery and a method for making a partition wall to be used in such a battery.

Monopolar batteries are recognized by one or more electrodes of the same polarity being connected in parallel and combined within the same cell unit in one corner or at one side of each electrode and by the current via a metal connector being conducted through the cell and over to the next adjacent cell of the same construction. The electrodes comprises active materials pasted on grids of lead. The monopolar battery, is thus characterized, among other things, by a large amount of conducting material.

In bipolar batteries, the electrodes of opposite polarity are united via an electroconductive partition wall having the positive active material on one side and the negative active material on the other side of the same wall. Between the positive and the negative active material in each cell, there is a separator, consisting of a porous, acid resistant material, that separates the negative and positive electrodes and also contains elctrolyte. The electrodes and separators are stacked together to comprise a pile with current connectors in both ends. It is important that the pile is so designed that no stray currents can pass from one electrode in one cell to the electrodes of opposite polarity in another cell. Accordingly, there must not be any eletrolyte connection between the cells. The advantage of the bipolar design is thus that the current transport occurs from one cell to the adjacent cell through the partition wall and not from the active material to current collecting grids and via a lug, a post or a connector to the adjacent post, lug grid and finally to the active material in next cell. The weight savings may for this reason be considerable and the inner resistance substantially lower.

In bipolar lead acid cells so far known, the positive active material (PAM), which is porous lead dioxide, must be in direct electric contact with the conducting partition wall (e.g. made from metallic lead), which also contacts the negative active material (NAM), which is porous lead. The lead wall will corrode during repeated charging and discharging if no special measures are taken. The elelctrolyte in one cell may then come into contact with the electrolyte in the adjacent cell and shortcircuiting (stray currents) appears. In all lead acid batteries volume changes of the active materials appear during charging and discharging. In the discharge process, lead sulphate ($PbSO_4$) is formed from both lead (NAM) and $PbO_2$ (PAM), and assumes a substantially larger volume than the compounds from which it was formed. Corrosion of the positive side of the lead wall also brings about changes in the volume; non porous Pb is transformed to $PbO_2$. If the conducting wall does not have enough mechanical strength to resist the forces from the expansion of the lead and the lead dioxide during discharge or from the increase in volume due to the corrosion of lead, the wall will bulge and crack with break through and shortcircuiting as the result. It will also be difficult to retain the tightness with respect to the other cells in the pile.

U.S. Pat. No. 4,297,421 concerns an electrode for the use in e.g. bipolar batteries, which is intended to solve the above problems. To this end the electrode consists of a composite of a anodically passivatable metal, e.g. titanium, infiltrated by a metal capable of forming an electroconductive oxide, e.g. lead. This electrode, however, suffers from a number of disadvantages. The passivation on the positive side of the matrix metal reduces the desired high conductivity of the electrode. The matrix metal (Titanium) will dissolve on the negative side, thus severly reducing the working life of the electrode. Further the matrix metals intended for use are very expensive as is the manufacturing of the electrode due to the difficulty in working with these metals.

If the wall was to be manufactured from a porous non-dimentional stable material, as e.g. a thermoplastic material, the pores would grow in volume when they are exposed to the increasing volumes caused by the transformation of lead to $PbO_2$ and $PbSO_4$. These compounds would then expand more or less without control and form porous layers giving the electrolyte and current the possibility to penetrate further into the pores. This would result in fast corrosion and shortciruits, why these materials are not suited in partition walls.

SUMMARY OF THE INVENTION

It is an aim of the invention to provide a bipolar battery that solves the above mentioned problems associated with the bipolar batteries so far known. It is also an aim to provide a method of making an electrode for use in such a novel bipolar battery.

These aims are achieved by a bipolar battery.

By thus the wall being comprised of a dimensional stable non electroconductive porous material with pores which are to be filled with lead or a similar method or alloy, superior stability and resistance against corrosion and leakage is achieved with extremly good charging and discharging durability. Further, the battery is inexpensive in manufacture, light and effective.

Further advantages are achieved by the features of the subsequent claims as will be clear from the following description.

BRIEF DESCRIPTION OF THE DRAWINGS

The invention is now described in greater detail with reference to the accompanying drawings wherein.

DESCRIPTION OF THE PREFERRED EMBODIMENTS

In the Figures like details are allotted the same reference numerals.

Figure 1A:
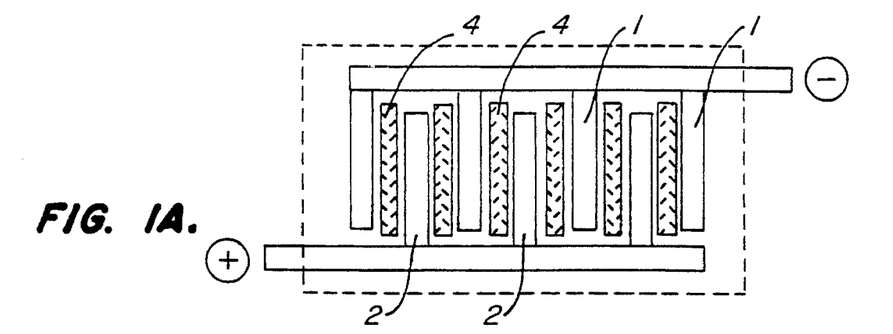
FIG. 1A diagramatically shows a monopolar battery.

FIG. 1A thus illustrates a monopolar battery with negative 1 and positive 2 electrodes separated by electrolyte containing separators 4. The respective electrodes are connected to current collectors at the sides or the corners of the electrodes why the load will be at the highest adjacent the collectors and unevenly distributed over the surfaces of the electrodes.

Figure 1B:
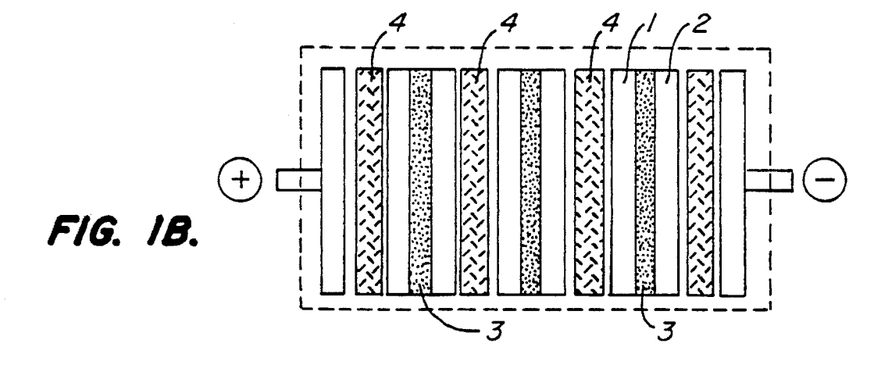
FIG. 1B shows diagramatically a bipolar lead acid battery.

In a bipolar battery, as illustrated in FIG. 1B the current passes the electrodes uniformly why the utilization of the active material is highly increased. A bipolar battery is therefore well suited for high currents per electrode surface unit. As the mass of conductive lead is proportional to the discharged current for a given inherent resistance, the bipolar battery is possible to construct considerably lighter than the monopol battery.

The stacked bipolar battery as illustrated in FIG. 1B consist of a number of cells, divided by electroconductive walls 3 each being provided with negative and positive electrodes 1, 2 on the respective sides. Each cell further comprises an electrolyte contained in a separator 4 which consists of a porous acid resistant material. The stack is ended by endparts 26 (see FIG. 6) and the electric connection is achieved by electric connectors 30.

Figure 2A:
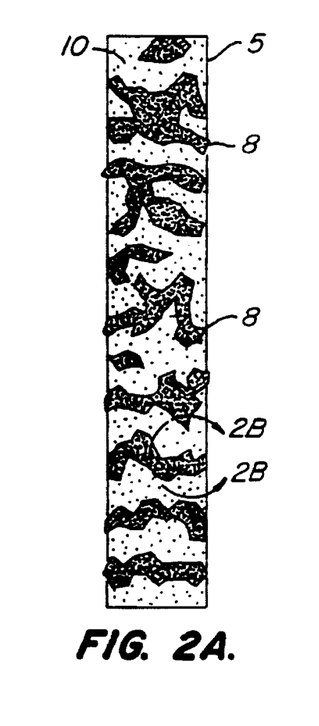
FIG. 2 shows a partition wall for use in a battery according to the invention.
Figure 2B:
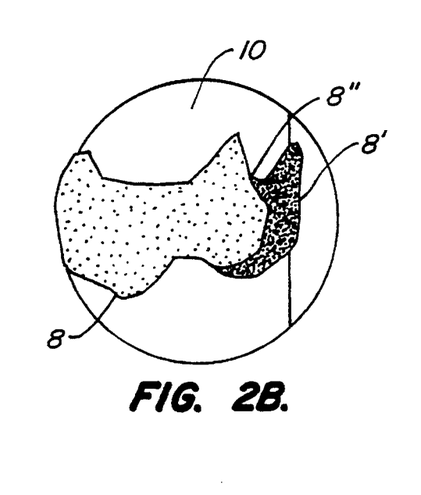

FIG. 2 shows a partition wall 5 according to the invention as well as a magnified part thereof.

For very high currents the layers of the active materials may be made thin so that the battery produces a high energy content per weight and volume unit. This is desired, particularly if the battery is to be used in e.g. vehicles. From what has been said also follows that the partition wall should be thin but contain much electroconductive material. By using a thin partition wall, the short current path way results in low resistance, but also the disadvantage of lower mechanical strength with a risk of cracking and through corrosion of the partition wall.

The partition wall 5 is capable of giving the bipolar battery a high energy content at high currents and further also a considerably working life in spite of the thickness being preferably only between 0.5 to 5 millimeters. The partition wall 5 is comprised of a non electroconductive dimensional stable porous material 10 having pores 8 passing from its positive to its negative side. By the term dimensional stable material is to be understood a material that does not change mechanically or chemically at the conditions within the battery during its operation and is thus acid and oxidation resistant. The porosity is easily tested by one skilled in the art but may range within 5–50% and preferably between 15 and 40%. The pore diameter ranges between 4 to 500 μm and the thickness may (see above) range from some tenth of a millimeter to several millimeters depending among other things on the size of the electrodes. According to the invention the porous material may, besides from ceramic materials also be manufactured from glass, other inorganic materials and dimentional stable polymeric materials may also come into question.

Ceramic materials and glass have the advantage that the wall can compensate for forces appearing during charging and discharging and which tend to bend the partition wall. Such materials also have the advantage of the size of the pores being unchanged even at the large forces that appears due to formation of corrosion products. Ceramic materials and glass are examples of materials that are preferred in the invention, but the invention is not, however, limited in this respect. A porous polymer can of course be used if it is dimensional stable at those temperatures that may result in the lead acid battery and is within the scope of this invention. It can be advantageous or necessary to reinforce such polymers, as well as ceramic materials, with high tensile fibers as e.g. glass- or Kevlar- or boron nitride fibers. One may also imagine that the non-conducting part of the wall can be formed around threads of conducting materials, e.g. lead. It is important that the dimensional stable material is also resistant to sulphuric acid and anodic oxidation.

In order to increase the strength of the lead impregnated wall as much as possible, the wall can be reinforced with e.g. boron nitrides or alumina. In this way it is possible to make partition walls of thicknesses less than 1 mm, depending on the surface area of the cell.

Further the partition wall pores 8 are entirely filled with lead, a lead alloy or a similar metal (antimony and tin). In operation, when the lead in the pores starts to change to $PbO_2$ or $PbSO_4$—compounds that have larger volumes than the lead—the further transformation can not occur since the electrolyte is prevented from penetration into the filled pores.

It is important that most of the pores are open in both ends and preferably windling, i.e. not straight, especially at thin partitions, and that the pore diameters vary along the pore lenght to prevent corrosion along the pores. By varying the pore size, the current lines, that normally are perpendicular to the plane of the partition wall, are broken, (see FIGS. 2–4). At 8' there is partly a general corrosion, partly an attack along the walls of the pore due to local high current density. The corroding lead, that has been transformed to lead sulphate or lead dioxide is forced out of the pore. When the corrosion has reached 8" the corrosion surprisingly ceases, partly due to the volume being protected from attack from the current, partly due to the compression of the corrosion products against the incompressible wall. It is thus important that the material is dimensional stable, i.e. has pores that remain constant in volume even when the pore walls are exposed to the mechanical pressure that appears when the lead is expanding or chemically transformed.

Figure 3:
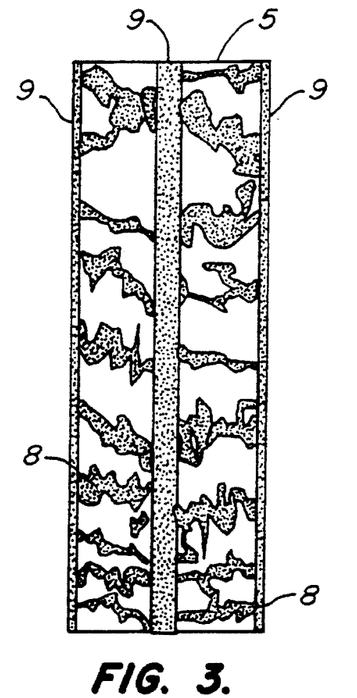
FIG. 3 and 4 show two different modifications of the battery wall.

To achieve higher mechanical strength of thin walls, the percentage of lead in the conductive partition wall is low, but in spite of that the walls can have good electric conductivity due to the short distance. To obtain a higher security against corrosion through the wall, two or more conductive slices are put together on top of each other (as illustrated in FIG. 3). Each conductive wall may, for further protection against through corrosion and also to achieve better contact with the active materials, be provided with a layer 9 of lead on both sides, 5–150 μm thick.

The pores of the porous material may be filled with lead (or the like) in various ways. The following methods are only to be regarded as examples. The porous material may e.g. be heated in vacuum to a temperature above the melting point of lead and then—still in vacuum—be dipped into molten lead. It can be advantageous to apply the molten lead under pressure into the pores (which could be subject to negative pressure); pressure die casting. The lead then may be left under pressure during the elapse of the solodification and thus facilitate completely filling of the pore volumes. Otherwise empty spaces might result from the decrease in lead volume during the solidification process. It is important to have a tight adhesion of lead to the pore walls. For that reason the porous body, if ceramic or glass material, is impregnated with e.g. silica gel which after drying formes a so called wash coat consisting of small $SiO_2$ particles. By this procedure the pore walls will obtain a porous surface to which lead adheres physically as well as by chemical reaction with the $SiO_2$. The impregnation with silica is best applicable to porous glass and ceramics. A safe way to prevent the formation of empty spaces in the partition wall is to mix crushed glass (preferably with glass fibers or boron nitride fibers) with molten lead and then form conductive partition walls from this mixture. If the contents is 60% or more of the non conductive materials, it is not always possible to cast such slices. Instead they have to be formed under pressure during the solidification period. These plates may possibly have less mechanical strength than porous ceramic plates, which have pores filled with lead. If, however, the battery (the pile) is kept under high pressure, the plate will be dimensional stable anyhow. In order to increase the durability, the plates made from lead and glass are heated under pressure to a temperature where the glassy material melts and binds to possibly used glass fibres, and also reacts chemically with the lead. The glass may be substituted with ceramics having the same properties as the glass.

Figure 4:
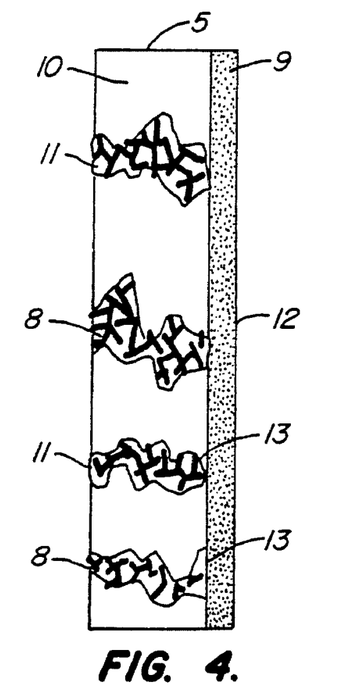

Another method is to electrolytically fill the pores with lead as is illustrated in FIG. 4. In such a process lead is grown into the pores of the partition wall from a cathode 12 of lead or copper that is applied closely to the back side of the material. This cathode may e.g. be a thin, flat foil of lead, preferably 100–500 μm thick. The cathode may also be comprised of a foil of lead, that first has been made porous by so called Plantéformation and then, after electrolytic fixing onto the porous partition wall, may serve as the active material. The porous electrode either comprises the NAM without further treatment (except rinsing and drying) or is transformed to $PbO_2$ through electrolytic oxidation in diluted sulphuric acid and will thereafter be able to serve as the positive electrode (PAM).

At the electrolytic precipitation of lead in more or less concentrated electrolyte comprising a lead salt, a pulsating current may be used in a way known to the experts in the field. Lead ions diffuse into the pores during the idle periods and is precipitated during the periods of current flow. In order to induce the precipitation at the pore walls, one might first cover these with a thin layer of lead obtained by a treatment in gaseous lead under low pressure in the same way as plastic films are covered with lead layers thinner than 1 μm. Gaseous lead will always be able to penetrate into the pores. To tighten free spaces possibly formed between the walls of the pores and the electrolytically precipitated lead, polytetrafluoro ethylene, or the like may be used. Polytetrafluoro ethylene also restricts the penetration of the sulphuric acid by its inherent hydrofobic properties.

As indicated above, the partition wall must not in it self be constructed originally from a porous material but may comprise a matrix or lead that has been reinforces with non-conductive inorganic materials or dimensional stable plastics.

Another example how to make a partition wall according to the invention is to embrace a large number of mainly parallel strings of lead with an inorganic material or dimensional stable polymer. After a certain reaction time when the material hardens in different ways, according to the type of materials, slices are formed by sawing or in any other way so that lead surfaces are opened on both sides of the wall. An example of materials suitable in such a process is Nasilicate, which reacts with the lead on the surface of the strings to an insoluble, non-conductive compound. Another example is an organic material in the form of two or more compounds that are mixed and hardened to a dimensional stable material surrounding the lead strings. Still another example is a plastic material which is heat melted and applied around the lead strings and which shrinks during solidification.

Most suitable is to produce the bipolar electrodes as dry charged electrodes i.e. PAM and NAM have been transformed to $PbO_2$ and porous Pb respectively and dried in separate processes prior to assembling into a cell. These processes are well known to the expert in the field. By such procedures it is suitable to perform the formation (the first charge) in separate processes. This is possible if the bipolar electrode is made in two parts. In order to prevent the through-the-wall-oxidation it is also suitable to use a split partition wall.

Figure 7A:
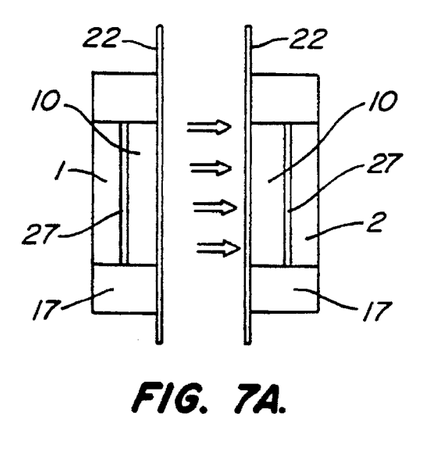
FIGS. 7A, B and 8A, B illustrate alternative processes in manufacturing a bipolar electrode for use in a battery according to the invention.
Figure 7B:
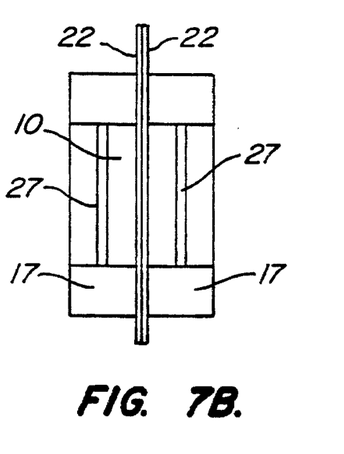
Figure 8A:
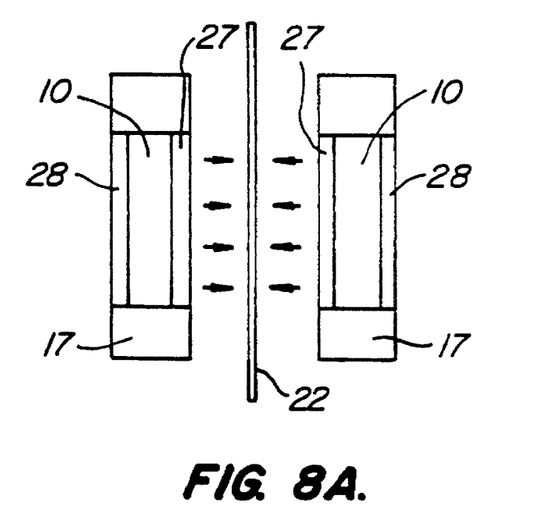

To obtain split bipolar electrodes one might use the method of fixing a lead foil on one side of the dimensional stable wall by electrolytic precipitation as was described above and when the lead has filled mainly all the pores and is seen on the opposite side, apply a leady paste in a per se known way. Before pasting said opposite side may be totally covered with an even layer of lead by melting, soldering or addition of more lead. When an electrode half of this kind is put together with a similar half provided with active material of opposite polarity, a modified bipolar electrode is formed, (see FIG. 7a, 7b and 8a, b where 10 designates the wall and 27 said even layer of lead).

Figure 8B:
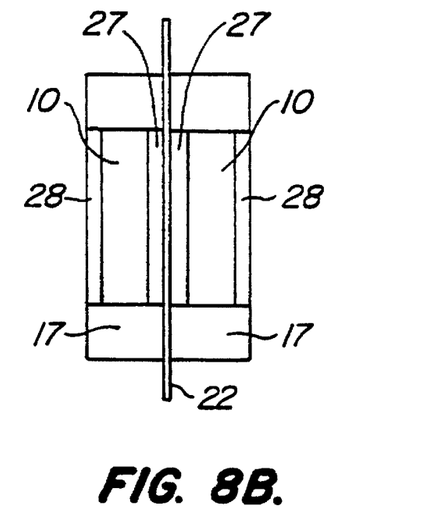

In an alternative process (see FIGS. 8a,b), specially preferred when thin porous lead foils 28 have been used as cathodes, the opposite sides are reinforced by melting or soldering and laid together so that another modified bipolar electrode according to the invention is obtained.

To obtain a long working life, it is, however, not always enough to prevent through corrosion of the partition wall. If the discharges are repeatedly driven too deep, there is a risk that the lead in the pores, at least in certain places, will be transformed to non-conductive lead sulphate, resulting in ceased contact through the cell wall. When a number of pores have been non-conductive, the load on the other pores increases and even if the resistance increases, the load per pore and thus the formation of sulphate, will increase by the serial connection of the whole battery. To prevent the contact through the wall being broken in very small pores, the wall may be laminated from two wall layers which are interconnected. One of the layers having low porosity and high mechanical strength and the other having large pores and accordingly lower mechanical strength. The low porosity wall will mechanically support the high porosity one, with its larger pores, which do not tend to break the electric contact.

Batteries which use electrolytes based on water solutions have a minimum operating temperature below 100° C. A lead acid battery e.g. shall not be used at temperatures higher than 50° C. during long period of time. Such conditions could cause lead sulphate to form in the active materials. With regard of the kind of discharges which here is mainly considered, the battery in its function very much resembles a capacitor—an "accumulator-capacitor".

Figure 5:
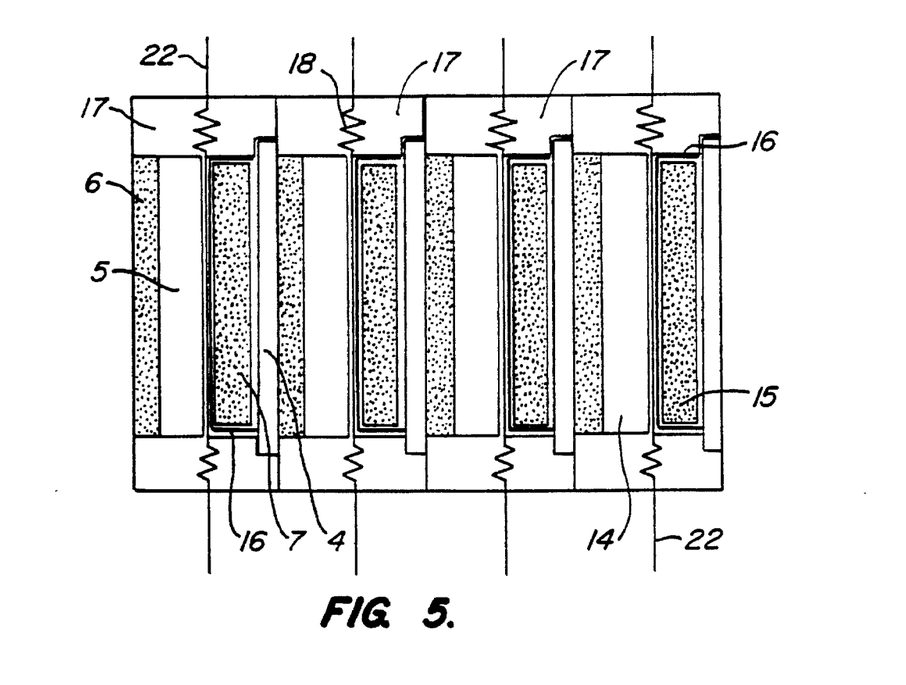
FIG. 5 shows a bipolar battery with sealing and cooling means.
Figure 6:
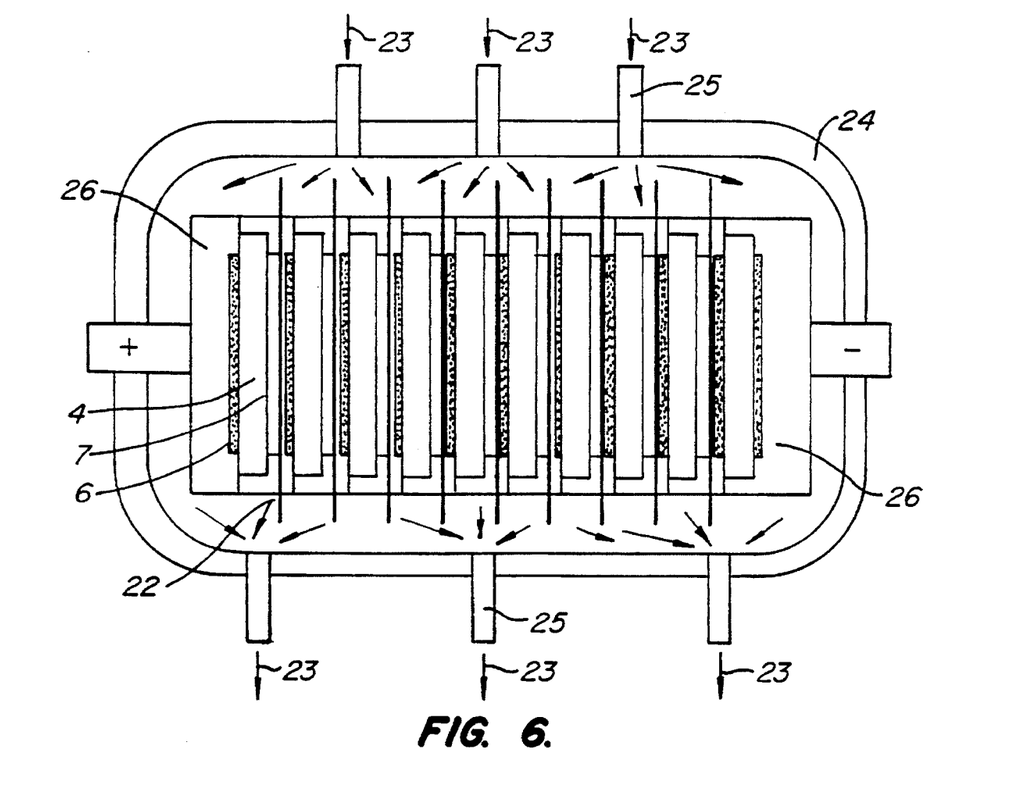
FIG. 6 shows a bipolar battery contained in a casing allowing cooling and pressurising of the battery.

It is thus of special importance at high power loads that the battery construction is effectively cooled. According to the invention this may be achieved by insertion of sheets 22 of metal e.g. lead coated copper with a thickness of 0.1–1 mm, between or at the bipolar electrodes. A preferred method is to put a metal foil between a positive and a negative electrode half produced in a way described above and by melting the lead of the three components assuring a good thermal and electric contact. As shown in FIGS. 5 and 6 these foils of metal are applied so that they protrude from the battery pile, and can be cooled by air or a liquid 23. It is not in it self necessary that these protruding parts of the metal foils have been arranged on the outside. By designing the electrodes and the partition walls with a center hole, cooling may be obtained by letting the cooling medium pass through the center of the pile, provided that sealing means 17 has been arranged so that no leakage occurs.

Since it is necessary to cool effectively at high current densities, the conductive partition walls are assembled with metal foils or metal sheets, preferably of lead coated copper, as has been mentioned before. As is shown in FIG. 5, a lead coated copper foil 22 on the back of the NAM is protruding via sealings 17 in the outer circumference of the cell (circular cross section of the bipolar pile). The copper foil can be bent 90° at the rim. Cooling is achieved with air or by a cooling liquid 23 (FIG. 6) as de-ionised water or preferable a non-conductive liquid, which is cooled by the use of a heat exchanger in a well known manner. Of course, it is instead possible to use a similar cooling means at the center and for larger cell diameters cool both at the circumference and at the center. When an outer container 24 (FIG. 6) is used this is provided with suitable inlets 25 for the cooling liquid.

One way of avoiding the bending and buckling of the wall is to make the electrodes as e.g. circular cells with not more than 100 cm² area. The lead coated copperfoil may then be bent 90° at the circumference over the separator. With a ceramic wall which is 2 mm thick, a 2.5 mm length of the bent cooling foil part is acceptable. With the cell diameter of 10 cm this results in a cooling surface of 8 cm² or 10% of the electrode surface. If the cooling effect is to be further increased, the copper foils may be bent outwards 90° and touch the battery container wall 24 (FIG. 6). The cooling liquid can be guided into the container and pass around the cooling flanges. The size of the protruding flanges thus depends on the desired cooling. The possibility of arranging the cooling surfaces outside the cell is mentioned only as examples and does not limit the invention. Preferably the diameter of the battery is not larger than making an outer cooling of the container (steel tube) sufficient.

As stated above, too deep discharges must be avoided to obtain long working life. Since one can not expect the user to limit the depth of discharge, it is preferred that the limitation is built into the battery. According to an embodiment of the invention this is achieved holding the volume of PAM constant (PAM is not allowed to expand) by keeping the electrodes and the separators under high mechanical pressure, of at least 1 kp/cm² but preferably higher, up to 10 kp/cm². The expansion of the active materials will thus be extremely small and only as high as is allowed by the compressed separators. When the pores or the pore openings of the active materials are filled with lead sulphate the discharge will cease and no through corrosion of the conductive wall can occur. To obtain this high pressure (and furthermore a high liquid- and gas pressure resp., see below) we refer to FIG. 6, which shows an outer wall of a battery pile consisting of stainless steel or the like tubular container 24. By the high pressure on the surface of the electrodes the active material need not have a higher density than what is needed not to crush the PAM at said high mechanical pressure. At thin PAM layers, the porosity shall be low in order to obtain good utilization of PAM. The porosity can be expressed as 1/D, where D is the apparent density of the PAM. A typical D value is between 3.6 and 4.5 g/cm³ and "low porosity" means D=4.2–4.8 g/cm³. By the high pressure during charging and discharging, the original apparent density of PAM is maintained and there is no risk of sludging and shortcircuiting. No really deep discharge can thus be obtained, if the pressure is high enough since the pores of PAM quickly will be filled with $PbSO_4$ and the voltage decreases. The porosity and the pore size may be adjusted with known measures so that the discharge ceases after a given number of discharged ampere-hours. A certain increase of the volume of PAM is allowed by the resilience of the highly compressed separators (e.g. of glass wool). The separators 4 may be compressed to very tight units if they are subjected to a high pressure. Such separators are assembled in a compressed state and then function as resilient material. They are compressed further by the said small volume increase during discharge and deliver a counter pressure against PAM compensating for the volume decrease that appears during the charging. This counter pressure is important to all lead acid batteries with regard to long working life and is specially important for "accumulator-capacitors" according to the invention. The pile of electrodes is thus assembled in the container 24 that withstands the necessary pressure from the pile, and functions as a container for cooling medium 23. The end parts 26 that supports the electrodes must have a stiffness that is adapted to give an even pressure to the whole surface of the electrodes.

As was mentioned above, an assumption for a long life of bipolar electrodes is that the partition wall can not be bent or otherwise change its form. To obtain a high grade of stiffness of the construction, the electrodes can be made small, having a surface of some cm² with flat, stiff end connectors (e.g. of copper) covering the whole surface. The electrodes are assembled under pressure why it is possible to control and maintain an unchanged form also with partition walls thinner than 0.5 mm. At higher electrical loads, however, larger surface areas, up to several dm² are needed. The mechanical impact on the cell wall increases and it is needed to make the conductive wall thicker to withstand the forces. The smallest movement or crack in the wall result in a risk of short-circuit as has been mentioned above.

Another way to receive higher effects is of course to connect a large number of bipolar batteries with small areas in parallel. In stead of cells with a surface area of say 700 cm², 10 circular piles each having a diameter of 10 cm are choosen and connected in parallel to receive the same battery capacity.

It is mentioned above at several occations that the pores of the dimensional stable material are filled with lead. Hereby not only pure lead but also lead alloys and similar metals and alloys are intended. Alloys have somewhat lower conductivity than lead but on the other hand in certain cases have better resistance against corrosion. To prevent bad contact between PAM and lead in the pores of the partition wall or adjoining lead layers caused by passive sulphate- or oxide layers, the lead may contain small amounts of tin or even antimony.

At discharge currents adjusted to discharge periods of about one minute or less and to 100% of discharge depths, PAM is utilized less well if-the PAM-layer is 0.5 mm or thicker. If capacities for longer discharge periods is wanted, PAM layers up to 1 mm and corresponding thick, compressed separators i.e. more electrolyte may be used to obtain good utilization.

The bipolar battery according to the invention, when it is designed for very high currents, may be used for e.g. certain igniting circuits or as power sources for vehicle propulsion. Turbines and Sterling motors have very low torsional force at start and at low rpm values why variations of the power output is slow. By connecting a motor of one of these types with an electric generator, an electric motor and the bipolar battery according to the invention, a high power, instant regulation can be obtained. In the same way the main part of the braking energy also can be regained by charging the bipolar battery. (See the applicants own Swedish Patent Application 8903987-9 "Hybrid vehicle"). Also Otto- and dieselmotors have low torsional force and bad efficiency at low rpm values and can be combined with electric motors and batteries according to the invention for the propulsion.

Batteries according to the invention when used as starting batteries for cars reach much lower weight than conventional starting batteries.

In certain cases the demand for charging and discharging currents are so high that batteries must be supplemented with capacitors. These are then advantageously connected in parallel with the bipolar battery. By putting together a large number of electrodes, the battery can be given an optional high voltage (more than 1000 V) which also characterizes a capacitor. By the parallel connection, the capacitor is capable of delivering a very short but high current after which the continued discharge current is delivered by the battery. It can also be suitable to use in the same way, the combination of a bipolar battery and a monopolar battery, where obviously the bipolar battery will deliver the immediate high power and the monopolar battery the long term capacity. This arrangement can be advantageous in those cases where the so called "coupe de fouet" can occur. At high currents monopolar batteries with relatively thick electrodes often show a sharp decrease of the cell voltage during the first seconds up to half a minute of the discharge.

Bipolar batteries according to the invention are preferably made sealed. They may even be made gastight with no vent caps due to their good oxygen recombination. When lead acid batteries are charged, oxygen is developed at the positive electrode before hydrogen is evolved at the negative electrode. The oxygen may be brought to oxidize NAM, which thus never will reach that potential at which hydrogen is evolved. For facilitating the oxygen to reach the negative electrodes, the separators in sealed cells are not entirely saturated with electrolyte and thus oxygen in gaseous form can be transported to the negative electrode. Another efficient way is to strongly increase the solubility of the oxygen in the electrolyte by strongly increasing the liquid pressure up to 5–10 atm or more. Good oxygen recombination is then obtained even with saturated separators. The battery according to the invention can be built into strong containers and it is thus easy to maintain these high liquid and gas pressures.

Since in bipolar constructions with cell lengths of some mm it is valuable to have oxygen recombination, one ought from the security point of view, to use high pressure as well as liquid unsaturated separators i.e. use separators not entirely saturated with electrolyte. Even if pure lead without addition of alloying elements is used, small amounts of hydrogen may be formed and must be given the possibility to diffuse out of the cell via the circumference sealings of the battery. Hydrogen diffuses fast through most plastic materials and one can increase the diffusion by making certain parts of the cell walls more suitable for hydrogen diffusion.

In order not to risk unsatisfactory oxygen recombination by charging with too high currents, especially when the battery is nearly fully charged and produces lots of heat, voltage supervision is recommended. This can be made automatically and prevents the cell voltage to exceed e.g. 2.35 V or another suitable limit depending on the temperature of the battery.

In the present description a bipolar lead acid battery has been described, the construction of which is aimed for charging and discharging at high current densities (high power) during short periods of time, preferably during parts of minutes and up to some seconds alternatively, though in certain cases discharging over several minutes is possible. The invention may, however, certainly also be applied for discharges and charges at low current densities.

EXAMPLE 1

The cells of FIG. 5 are tightened at the circumference by a plastic sealing ring 17. The copper foil 22 has a diameter that is 5 mm larger than the outer diameter of the battery pile. It is bent 90° at the circumference to fit into a tublar container. This way each electrode gets a cooling flange with a surface of about 9 $cm^2$ or 10% of the surface electrode. If the cooling flanges are arranged to contact the wall of the container, the pile may be cooled with water. To obtain better cooling with the cooling medium directly against the flanges, a volume is arranged by notches in the sealing rings for a flowing, non-conductive cooling liquid between the battery pile and the container wall.

EXAMPLE 2

The positive part of a 2 volt unit here called the semi-bipolar cell was manufactured by first applying a 250 μm thin lead foil very close to a partition wall made of a circular slice of 4 mm thick ceramic material with a diameter of 50 mm. The ceram had a porosity of 25% and the pore openings were about 10 μm. The ceramic slice was surrounded by an outer ring of PVC with a thickness of 5 mm. Thereafter, said lead foil was made cathodic in an electrolyte having about 250 g $Pb^{2+}$ per liter, and with the aid of a lead anode, lead was cathodically precipitated on to said lead foil. The current was 25 mA for 6 hours, 50 mA for 18 hours and 100 mA for 24 hours and the electrolytic cell was kept at room temperature. After 48 hours lead had penetrated the ceram and was seen as small balls protruding from the pores. The ceram was now rinsed with water and alcohol and dried by cool air. A fluid polyester two-component glue was applied to the ceramic wall in order to fill empty pores and empty spaces around the lead precipitations. The protruding lead was well protected not to be covered with the polyester. After hardening of the polyester, a leady paste was applied on top of the side with the protruding lead, and after curing and formation, the electrode was formed and dried all according to processes known to the expert in the field.

The negative electrode was made by gluing a ring of PVC, 2 mm high and of the same diameter as that of the positive electrode, onto a copper plate having a diameter of 80 mm. A leady paste was applied on top of the copper foil and within the PVC ring, dried, formed and dry charged according to known techniques.

A separator with a diameter slightly larger than the diameter of the positive and negative pasted areas was applied in a third ring of PVC 1 mm thick and with the outer diameter equal to that of the positive and negative electrodes.

Sulphuric acid was added to the separator and the porous active material and all three pieces, the positive electrode, the separator and the negative electrode, were put together on top of each other forming a 2 volt lead acid semi-bipolar unit. This unit is safe to handle since the leady material as well as the acid is well enveloped by the PVC, the lead foil and the copper plate. Several of these units were placed on top of each other with the lead foil pressed against the copper plate under an applied pressure, and thereby forming a bipolar battery pile of optional voltage.

We claim:

1. Bipolar acid containing battery comprising at least two cell units being divided by a dimensional stable non-electroconductive wall (5) comprising positive (6) and negative (7) electrodes in two adjacent cells and a porous material (10) having pores (8) passing from its positive to its negative side and having said pores (8) filled with an electroconductive lead or a lead alloy characterized by said porous material (10) being comprised of a non-electroconductive dimensional stable material and by the lead or lead alloy making electrical contact between two adjacent cell units.

2. Bipolar battery according to claim 1, characterized by the porous material (10) being selected from a group consisting of a porous ceramic and a porous glass.

3. Bipolar battery according to claim 1, characterized by the partition wall (5) being a layered wall having one layer of lower porosity than the other layer.

4. Bipolar battery according to claim 1 characterized by the porosity of the wall (5) being between 5 and 50% and preferably between 15 and 40%.

5. Bipolar battery according to claim 1, characterized by said wall (5) having next to its negative side a sheet (17) of heat conductive material, said sheet (17) having an area that is larger than the area of the wall (5), thus protruding from the cell and transmitting heat therefrom.

6. Bipolar battery according to claim 1, characterized by the cells being sealed by rings (17) of a synthetic material surrounding each element (4,5,6,7) of the cells, and means for applying an axial pressure to at least the rings (17).

7. Bipolar battery, according to claim 1, characterized by means (24,26) for applying an axial pressure of between 1 and 10 kp/cm$^2$ to the elements (4,5,6,7) of the cells.

* * * * *